US007800589B2

(12) United States Patent
Hurst et al.

(10) Patent No.: US 7,800,589 B2
(45) Date of Patent: Sep. 21, 2010

(54) TOUCH SCREEN WITH RELATIVELY CONDUCTIVE GRID (75) Inventors: G. Samuel Hurst, Knoxville, TN (US); Rufus H. Ritchie, Oak Ridge, TN (US); Donald W. Bouldin, Brentwood, TN (US); Robert J. Warmack, Knoxville, TN (US)

(73) Assignee: Tyco Electronics Corporation, Berwyn, PA (US)

( * ) Notice: Subject to any disclaimer, the term of this patent is extended or adjusted under 35 U.S.C. 154(b) by 1584 days.

(21) Appl. No.: 10/149,129

(22) PCT Filed: Dec. 6, 2000

(86) PCT No.: PCT/US00/33191

§ 371 (c)(1),
(2), (4) Date: Dec. 10, 2002

(87) PCT Pub. No.: WO01/41115

PCT Pub. Date: Jun. 7, 2001

(65) Prior Publication Data

US 2004/0135775 A1 Jul. 15, 2004

(51) Int. Cl.
*G09G 5/00* (2006.01)
(52) U.S. Cl. ..................... 345/173; 178/18.01
(58) Field of Classification Search ......... 345/173–178; 178/18.01–18.11
See application file for complete search history.

(56) References Cited

U.S. PATENT DOCUMENTS

| 3,662,105 | A | | 5/1972 | Hurst et al. ................. 178/18 |
|---|---|---|---|---|
| 3,798,370 | A | * | 3/1974 | Hurst ....................... 178/18.05 |
| 3,906,190 | A | | 9/1975 | Light ............................ 235/61 |
| 3,911,215 | A | | 10/1975 | Hurst et al. ................. 178/18 |
| 4,071,689 | A | | 1/1978 | Talmage et al. ............. 178/18 |
| 4,220,815 | A | | 9/1980 | Gibson et al. .............. 178/18 |
| 4,665,283 | A | * | 5/1987 | Kable et al. ............. 178/18.05 |
| 4,678,869 | A | * | 7/1987 | Kable ..................... 178/18.05 |
| 4,797,514 | A | | 1/1989 | Talmage et al. ............. 178/18 |
| 4,827,084 | A | | 5/1989 | Yaniv et al. ............ 178/18.07 |
| 5,218,173 | A | | 6/1993 | Garwin et al. .......... 178/18.08 |
| 5,510,813 | A | * | 4/1996 | Makinwa et al. ........... 345/173 |
| 5,815,141 | A | | 9/1998 | Phares |
| 6,650,319 | B1 | | 11/2003 | Hurst et al. ................. 345/173 |

FOREIGN PATENT DOCUMENTS

| EP | 0631256 A2 | 12/1994 |
|---|---|---|
| JP | 11161425 A | 6/1999 |
| WO | WO 97/34273 | 9/1997 |

OTHER PUBLICATIONS

International Search Report for International Application No. PCT/US00/33191, mailed Mar. 30, 2001.
Supplementary European Search Report, dated Jan. 9, 2007, for European Application No. 00 98 9226.

* cited by examiner

*Primary Examiner*—Bipin Shalwala
*Assistant Examiner*—Steven E Holton (57) ABSTRACT A new touch screen design provides for corrections of non-uniformities, more accurate touch point measurement, and multiple simultaneous touch point measurements through the use of a grid of relatively conductive lines.

11 Claims, 9 Drawing Sheets

TOUCH SCREEN WITH RELATIVELY CONDUCTIVE GRID

INTRODUCTION

Since their introduction in the early 1970s, touch screens have afforded attractive alternatives to keyboards for certain computer applications. In many situations the keyboard and mouse are eliminated, because the touch screen provides the user with a much easier access to the computer. As a consequence, the market has grown to a substantial size, and a continued rapid growth is anticipated. However, current touch screens are difficult to produce, which creates a price barrier limiting growth into many new areas, such as education.

In this disclosure, a new concept is discussed that virtually eliminates design constraints and provides more freedom for the configuration of touch screens. Examples are given to illustrate this new freedom in design parameters. These design concepts provide a basis for producing touch screens at a much lower cost, without sacrificing quality. Furthermore, the creation of new designs for special sensor size, shape, or electrical characteristics is greatly simplified with the concept described herein and reduces research and development costs.

BACKGROUND OF THE INVENTION

Touch screens based on materials that conduct electricity uniformly have been in use for several decades. One of the first touch screens was made from two sheets of conductive paper so arranged that two independent electrical fields ran orthogonal in a steady state (Hurst and Parks, U.S. Pat. No. 3,662,105). Later improvements consisted of using an array of highly conductive dots as electrodes around the rectangular perimeter and a complementary array of diode switches, or preferably a resistor network, such that only one conductive sheet was required. Potentials were then measured in a timed sequence (Hurst, U.S. Pat. No. 3,798,370) to obtain both an x and a y coordinate. This development, along with a conducting and transparent 'cover sheet' with radius of curvature discrimination (Hurst and Colwell, U.S. Pat. No. 3,911,215) helped pave the way to transparent touch screens that could be used on the computer terminal (Talmage et al, U.S. Pat. No. 4,071,689 and Gibson et al, U.S. Pat. No. 4,220,815).

When diode switches were replaced with voltage dividers using fixed resistors connected to a pattern of highly conducting dots, the switching required to sample the two time sequenced electrical fields was greatly simplified. This concept evolved into the use of a carefully designed frit pattern in order that equipotentials could be representative of Cartesian coordinates (Talmage et al, U.S. Pat. No. 4,797,514) even near the edges of the screen. Recently a bordered electrode design was introduced (Hurst, et al. U.S. Ser. No. 09/262,909, now U.S. Pat. No. 6,650,319, issued Nov. 18, 2003) to greatly simplify the production of touch screens. This design consists of a narrow border that encloses the working area and is made of a material that is intermediate in electrical conductivity between the highly conductive electrodes and that of the sensor coating.

The present disclosure relates to a touch screen whose rectangular area is enclosed with a border that is divided into a number of smaller rectangular areas using lines of specified width and electrical conductivity. With this technique the coating uniformity requirement is reduced. Essentially, uniformity requirements apply not to the entire area of the touch screen but to the smaller areas defined with the grid of conducting lines. With this innovation, the construction of large touch screens, even wall size or floor size, can be accomplished. This would make possible a number of new applications such as interaction with image projection equipment, input information for robots, position sensitive information for security, or inputs for virtual reality equipment.

With modern electronics technology, it is economically feasible to apply corrections to data from touchscreens with non-uniform fields to obtain accurate Cartesian coordinates. For example, Hurst, et al. U.S. Ser. No. 09/262,909 has shown that topological mapping can be advantageously used to build resistive touch screens with relaxed uniformity requirements much more economically, without the loss of performance. In this topological method equipotential pairs are mapped to a pair of Cartesian coordinates even under conditions where individual equipotentials do not map to give unique x and y coordinates. However, with some electrode geometry (for example a spot electrode at each corner of a rectangle) equipotential pair measurements on some regions of the sensor cannot be uniquely mapped to Cartesian coordinates. The use of the border concept provides unique pair mapping over the entire working area of the sensor, even very close to the edges.

The present invention provides a grid arrangement that makes more screen area available even without electronic data correction. However with extremely large screens which might be prepared with large individual sensing areas defined by grids, gross non-uniformity would be expected and, when necessary, electronic mapping may be applied.

SUMMARY OF THE INVENTION

It is therefore a purpose of the invention to provide an improved touch screen allowing improved screen yield with inherent tolerance for individual and lot variances. It is a further object of the invention to permit simplified manufacture requirements for touch screens including less-demanding conductive-coating application; fewer electrodes and no divider resistors. It is yet another purpose of the invention to permit manufacture at low additional cost, more than offset by savings in screen manufacture. It is another purpose of the invention to permit liberated design of touch screens with changes readily implemented to accommodate new larger screen configurations.

In one aspect, the invention provides a touchscreen position sensor that comprising:

(a) a touch area having generally relatively low conductivity;

(b) a relatively high conductivity border defining a perimeter on the touch area;

(c) a grid of intermediate conductivity defining cells of relatively low conductivity within the high conductivity perimeter of the touch area;

(d) a set of electrodes attached to the high conductivity perimeter and connected to an electrical power source;

(e) an electric circuit that measures the potential of a selected point on the touch area when brought in proximity thereto;

(f) a controller that sequentially switches electrical power from the power source to a first group of the electrodes thereby establishing a first electrical potential distribution on the touch area, and then to a second group of said electrodes thereby establishing a second electrical potential distribution on the touch area; and (g) a controller that processes sets of potential measurements of said first and second electrical potential distributions from the electric circuit to determine the location of the selected point.

The sensor of the first aspect may have a controller that selects subsets of a first set of cells to poll a subset of the cells, and the polling of subsets of cells may permit the determination of more than one point of simultaneous contact with the touch area. The sensor of the first aspect may have a relatively high conductive border with a conductivity at least ten times greater than the conductivity of the relatively lower conductive touch area and the grid of intermediate conductive material may have a conductivity at least four times greater than the relatively low conductivity touch area.

In a second aspect, this invention provides a touchscreen position sensor comprising:
(a) a touch area having generally relatively low conductivity;
(b) a relatively high conductivity border defining a perimeter on the touch area;
(c) a grid of intermediate conductivity defining cells of relatively low conductivity within the high conductivity perimeter of the touch area
(d) a set of electrodes attached to the high conductivity perimeter and connected to an electrical power source;
(e) an electric circuit that measures the current received by an electrode from a selected point on the conductive area when the point is touched; and
(f) a controller that processes sets of current measurements from the electrodes to determine the location of the selected point.

In a third aspect, this invention provides a method of determining the location of a selected point on a sensor apparatus having a relatively highly conductive border surrounding an area of relatively low conductivity featuring a grid having a conductivity intermediate the conductivity of the border and low conductivity area, defining cells on the low conductivity area, and an associated set of electrodes through which electrical current may be applied to establish electric potential distribution on the conductive area, an electrical circuit that measures the potential of points on the conductive area when brought in proximity thereto and a controller, comprising the steps of:
(a) introducing an electrical current to the border area through a first group of at least one electrode selected from said associated set of electrodes, and thereby establishing a first electric potential distribution within the border;
(b) bringing the electrical circuit in proximity with a selected point within the border and thereby measuring a first potential reading of said point;
(c) storing said first potential reading;
(d) introducing an electrical current of the border area through a second group of at least one electrode selected from said associated set of electrodes and
wherein not all of said first and second groups of electrodes are identical, and thereby establishing a second electric potential distribution within the border;
(e) measuring the second potential reading of the selected point with the electrical circuit; and
(f) processing said first and second potential readings to determine the location of the selected point.

The method of the third aspect may provide that the controller sequentially switches electrical power from the power source to a first subset of the electrodes thereby establishing a first subset electrical potential subset distributed within a first subset of cells as the touch area, and thereto a second subset of said electrodes thereby establishing a second subset of cells on the touch area, the controller processing the sets of potential measurements of said first and second subset electrical potential distributions to more precisely determine the location of the selected point within the cells of the intersection of the first and second subsets of cells. Alternatively, the method may provide that the first electric potential distribution defines a first set of potential lines within the border and the second electric potential distribution defines a second set of potential lines within the border, and said first and second sets of potential lines substantially intersect. Furthermore, the method may provide that the locations of multiple points of simultaneous contact are determined by polling separate subsets of cells, each subset of cells being selected to contain only one point of contact.

In a fourth aspect, this invention provides a touch sensor having a touch area of generally low conductivity defined by a border of relatively high conductivity wherein the touch area is divided into cells by lines of intermediate conductivity. In this aspect, the touch sensor the conductivity of the low conductivity touch area may not be uniform or the conductivity of the low conductivity touch area within a single cell may be substantially uniform. Alternatively, the lines of intermediate conductivity may be sufficiently close together that the low conductivity touch area within a single cell is substantially uniform.

DETAILED DESCRIPTION OF THE INVENTION

Computer simulations of the salient features of the grid invention have been made, with programs that solve boundary-value problems. Mathematical methods of solving equations of continuity coupled with a general relationship between current and electric field are used. These equations work for arbitrary conductivity and reduce to Laplace's equation for uniform conductivity. This general mathematical treatment leads to solutions for the equipotentials on conducting planes for any prescribed boundary conditions. For instance they can provide equipotential solutions for geometry where bordered frames are held at stationary electrical potentials, as in a resistance touch screen. As another example, solutions for the currents at the four corner electrodes when current is injected at a touch point in a rectangular sensor bounded by the bordered frame can be found. These so-called current injection methods have been used in physics research and for touch screen production for some time. A recent patent application by Babb and Wilson (PCT, publication number 97/34273) describes the method and gives references to some earlier developments. These bordered frame geometries can be modified to incorporate grids to show the advantages of such innovations.

Figure 1:
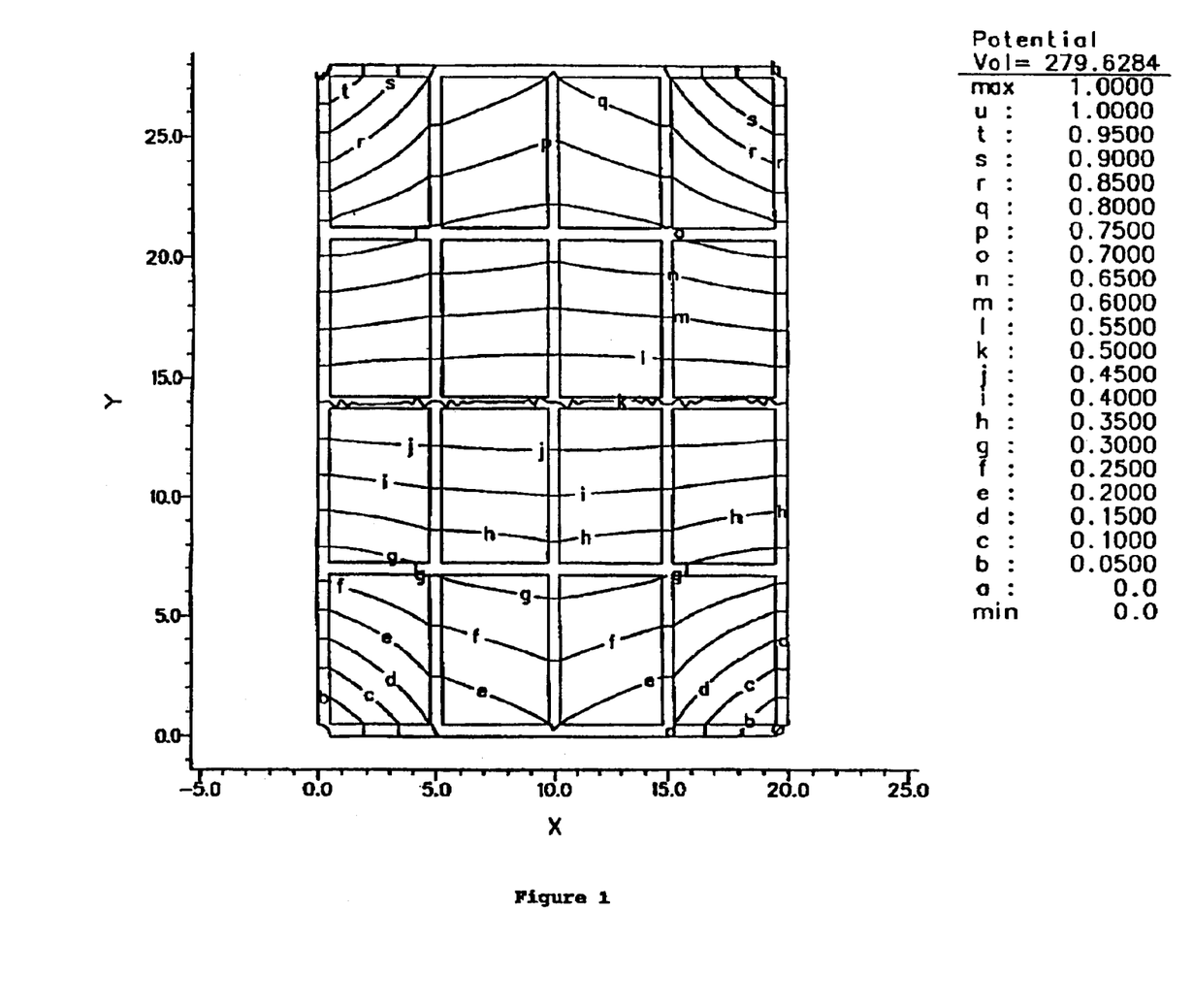
FIG. 1 shows the equipotentials for a grid having the same conductivity (inverse resistance per square) as the bordered frame.

FIG. 1 shows the steady-state equipotential solutions for a grid in which the bordered frame is simply extended to the interior regions to create 16 discrete areas or cells. This geometry in which the frame and the interior lines have the same width and electrical conductivity is not successful as a touch screen, without topological mapping, since there is excessive distortion of the equipotential lines. All of the framing materials and the interior grid lines have an electrical conductivity that is 500 times that of the coating (taken to be 1).

Figure 2:
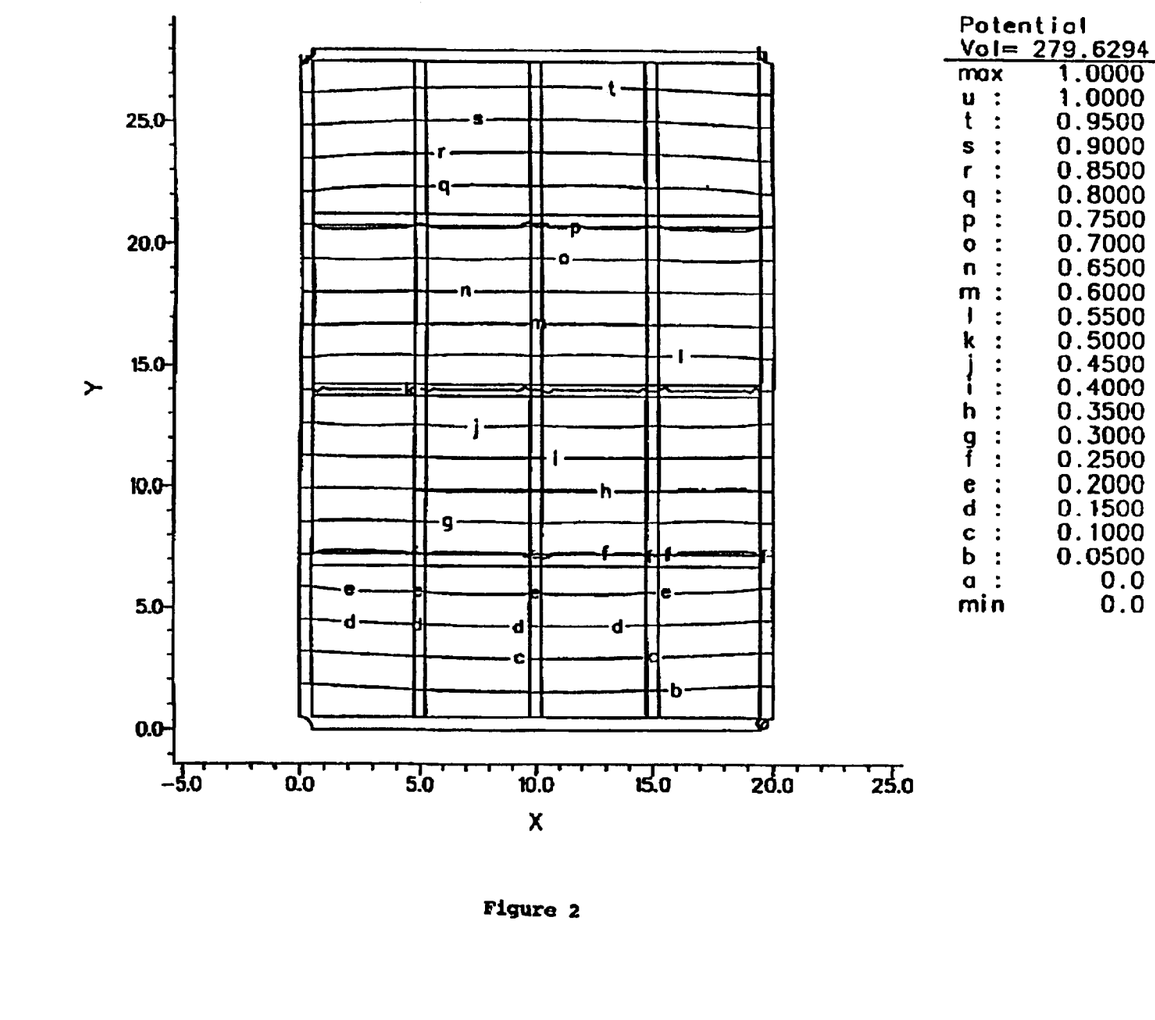
FIG. 2 shows the equipotentials for a grid having a conductivity only one-fiftieth (1/50) of the bordered frame and twice the conductivity of the remaining surface area.

FIG. 2 applies to a grid in which the interior lines have a conductivity that is reduced by a factor of 50 over those in FIG. 1. Thus three values of conductivity, 500 for the frame, 10 for the grid lines, and 1 for the coating, are involved. It is seen that the equipotentials are dramatically improved by this combination of conductivities, when used in the grid concept.

Due to some restrictions in the computer-simulation program, accurate solutions for very narrow lines cannot be obtained. For this reason, it is convenient to work with rather wide grid lines and then to scale the results to narrow lines of higher conductivity. There is a very simple rule for this scaling. To keep the same resistance on the grid lines, the scaling law is that the product of conductivity with the width of the line should remain constant during the transition. For instance, good equipotentials were found by using the prescribed conductivity. For convenience in production it would be much better if all of the lines making up the grid have the same conductivity. If the lines have a width of 0.2 inches, the equipotential quality is maintained for a line width that is reduced by the factor of 50 to 0.004 inches (4 mils), where all of the lines now have the same conductivity. This is very fortunate since the visual appearance of the screen is improved by having very fine lines. However, it is possible to make conducting coatings transparent to light, and in this case lines of appropriate conductivity can have a range of widths.

Figure 3A:
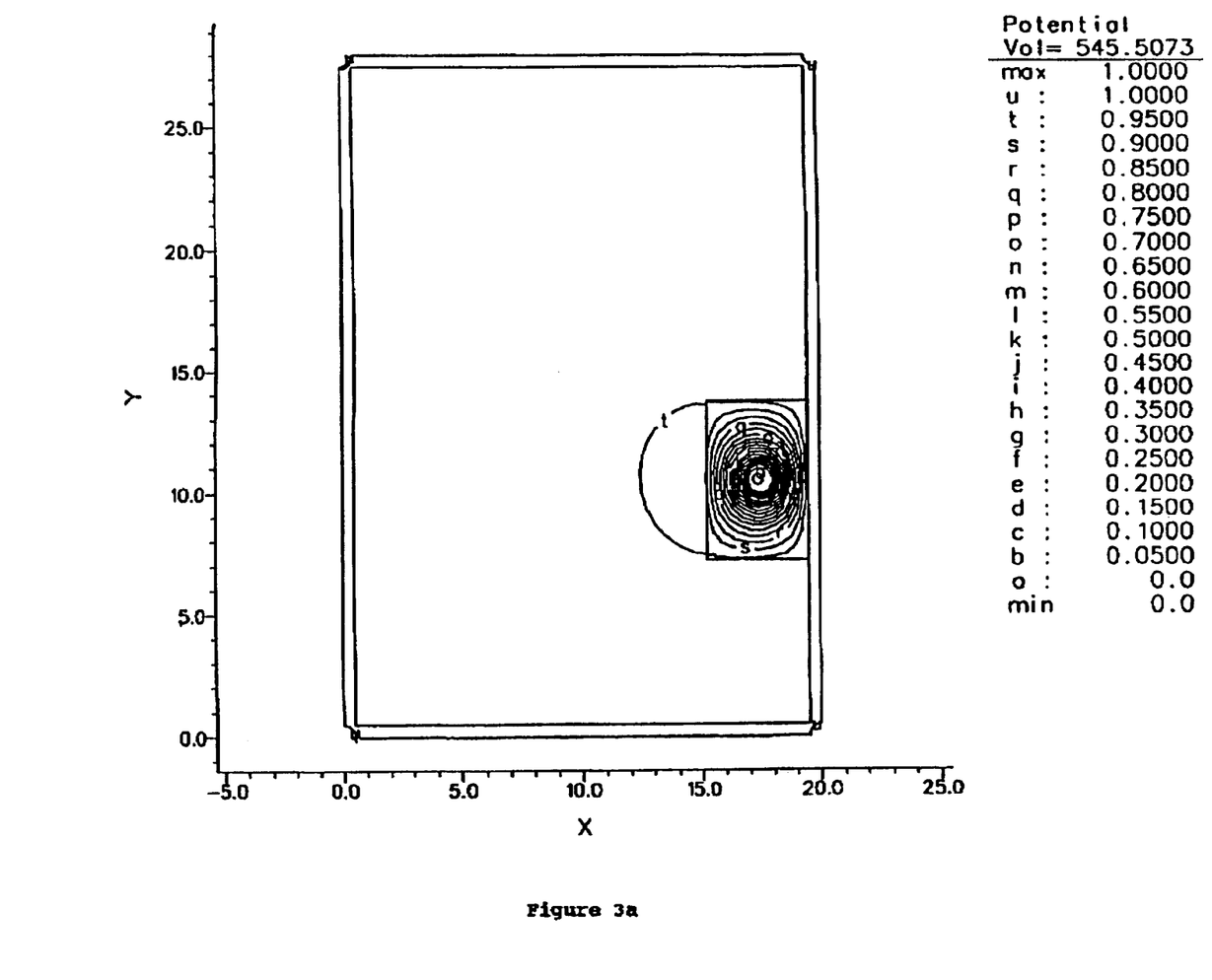
FIG. 3A shows the effect of a grid on reducing the requirement for uniformly conductive coatings when employed with the method of current injection on a substrate having a relatively uniform conductivity.
Figure 3B:
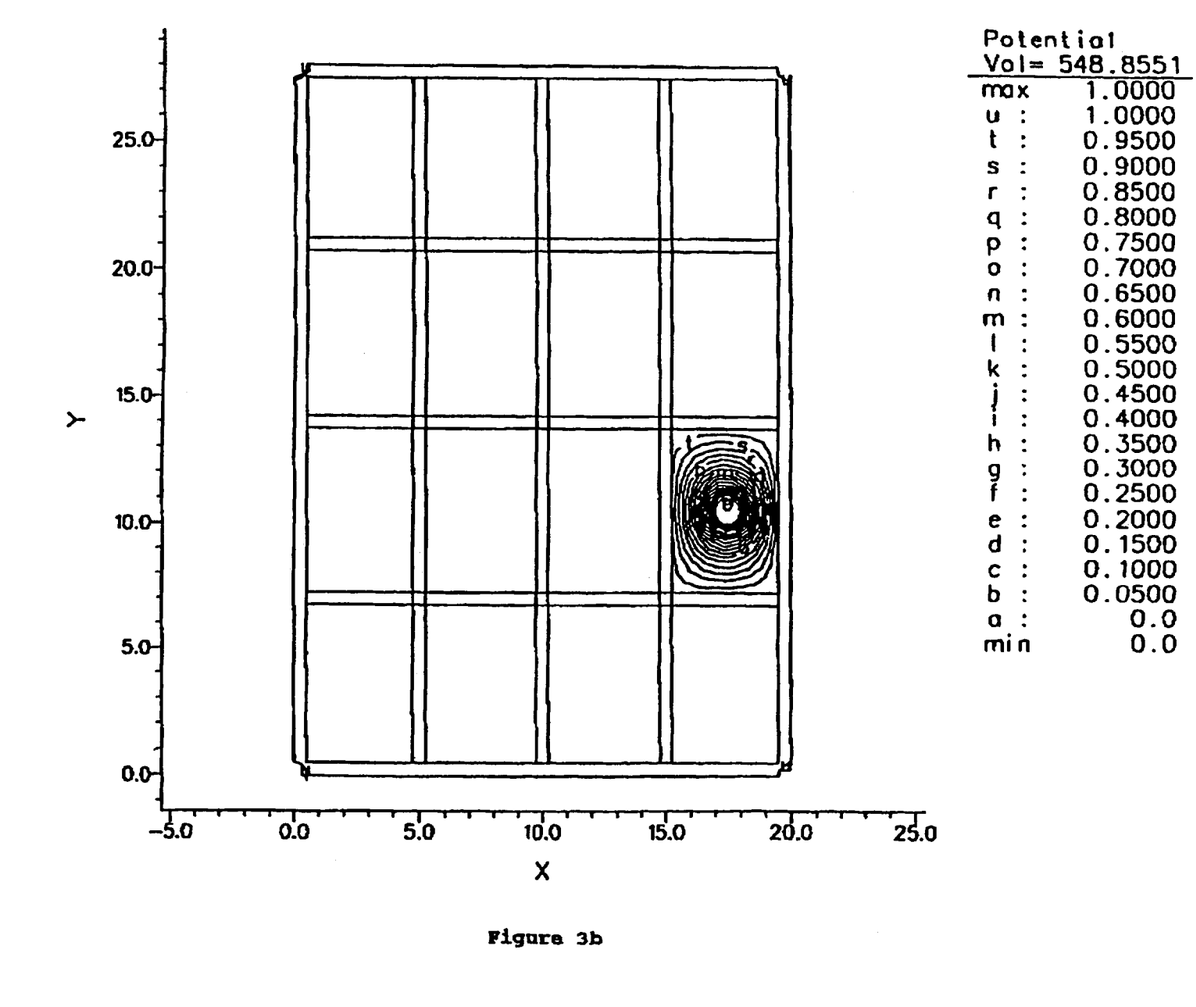
FIG. 3B shows the addition of a grid having ten times the conductivity of the designated rectangular portion of the screen in a current injection touch screen.

FIGS. 3a and 3b apply to the method of current injection, and show the effect of the grid on reducing the requirement for uniformly conducting coatings. This was done by taking the conductivity to be 0.1 in the designated rectangular portion of the screen. In FIG. 3a, the solution for the equipotentials, from which the four corner currents can be derived and processed to obtain Cartesian coordinates, is rather asymmetric. The '4 mil' grid, providing a ten-fold increase in conductivity around the same region in FIG. 3b, gave much better behaved equipotentials and when processed gave Cartesian coordinates that were much closer to the correct values.

Figure 4A:
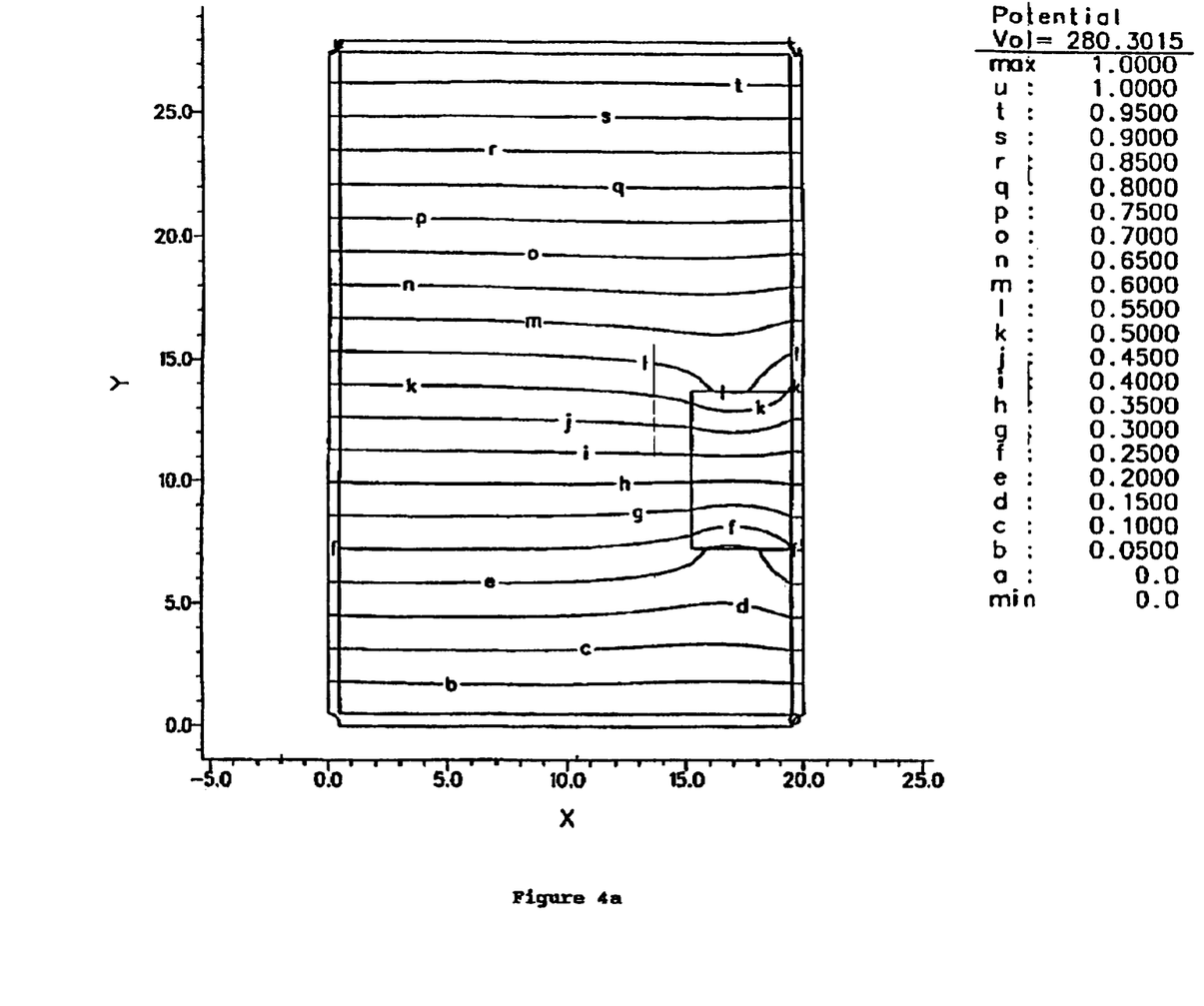
FIG. 4A shows the entire screen with conductivity of 1 except for the designated rectangle having a conductivity of 0.1 and the equipotentials are distorted around that rectangle.
Figure 4B:
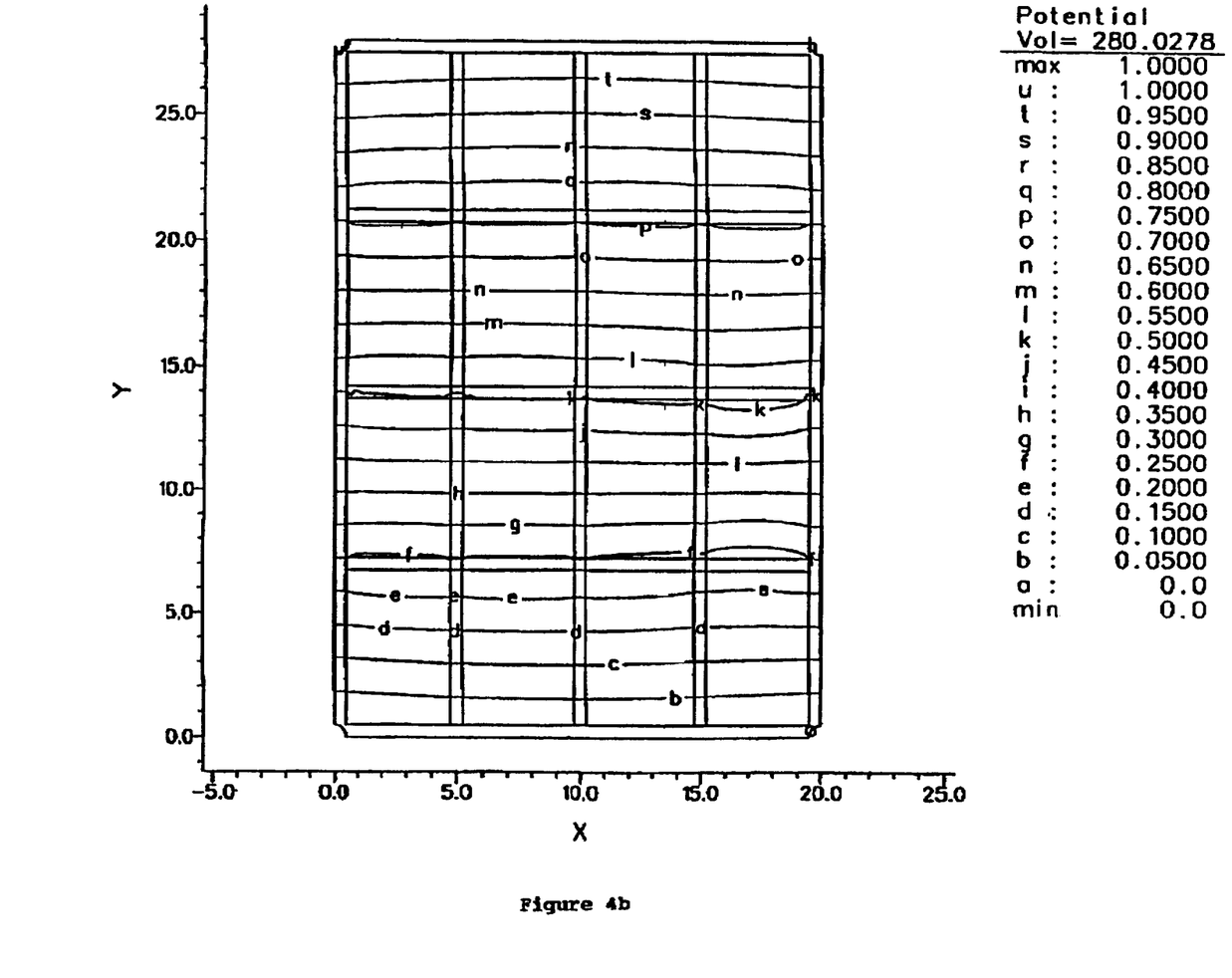
FIG. 4B shows the same screen as FIG. 4A except with the addition of a grid of intermediate conductivity which restores the equipotentials to values close to those achievable with a perfectly uniform coating.

The advantage of using the grid is much easier to illustrate with the method in which the grid is held at steady-state potentials everywhere on the sensor and coordinates are found just by measuring a pair of potentials at some place on the screen. With the same construction as in FIG. 3, we show these results in FIGS. 4a and 4b. Thus even for the rather drastic reduction of conductivity to 0.1 within the designated region, the grid does a good job in restoring the equipotentials to the value they would have had with a perfectly uniform coating.

While the original concept of the grid was to enable the manufacture of very large screens, it is also useful to try to extend the technology to solve a basic problem with that has been common to all touch screens since their inception. This is the problem of 'multiple touch.' Imagine the use of touch screens in a robotics application, where it might be desirable to give information to a robot on the location of a number of different objects on a table. Or take another application where it might be desirable to know the location of individuals as they walk on a floor. In either case the technical problem is the same—namely, there are multiple contacts on the touch screen; whereas the usual touch screen is designed to be touched at only one point at a time.

To approach the solution of this problem, imagine the touch screen to be divided into cells with grid lines as described above. But before proceeding, also imagine another use of the grid and this will serve as a basic element of the solution of the multiple contact problem. Therefore, first it is desirable to describe a touch screen that can be used to zoom into smaller areas, thus to obtain greater resolution and accuracy of measurements of the location of a single touch point.

The idea is implemented by using a grid that is first configured in the standard way with voltages applied to the four corners and then switched in a timed sequence to estimate a coordinate pair (x, y). After a grid cell has been located in this way, the corner voltages are applied to two lines of x and two lines of y so that the appropriate cell is now singled out of the matrix of a large number of cells; the standard measurement sequence is repeated to obtain a much more accurate estimate of the point (x, y).

Sequential interrogation in large applications involving fast moving multiple contacts may, in some cases, be too slow. It is therefore helpful to develop algorithms to permit simultaneous interrogation of groups of grid cells so that no more than 8 or 16 current cycles are necessary before the interrogation is complete.

Another solution to the cell interaction problem is to divide the conducting cover sheet commonly used to contact the sensor surface into segments that match the grid cells. This requires the use of insulating strips on the cover sheet and the use of connecting lines from each segment to a matrix switch. In this way all of the cells with a single touch point could be counted and the position within each cell could be approximated. The zoom procedure described above could be applied in a timed sequence to obtain the location of the touch point on each of the segments with improved resolution. In other words, the location of each of the multiple touch points can be obtained with good resolution, provided that each cell has only one touch point.

The segmented cover sheet greatly simplifies the interrogation of each cell but seems to require a row-column matrix to activate individual or groups of cells. This can be accomplished with some burden on the manufacturing. Successful interrogation or polling of the screen may also be possible without segmenting the cover screen. The burden is placed on the computation.

Figure 5:
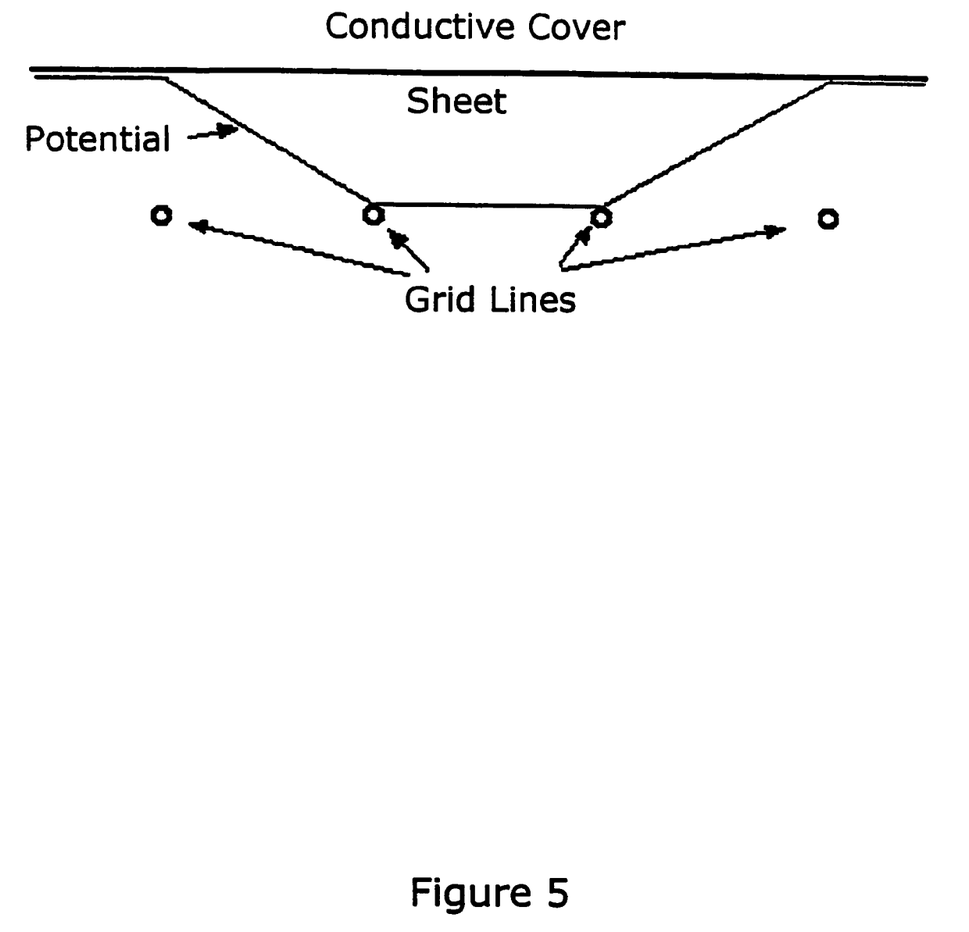
FIG. 5 illustrates the potential distribution with currents being generated in the individual grid lines that are biased when contact is made between the cover and bottom grid surface.

For example, if the floor of a room has grid with cells about 1-2 feet on a side, then the locations of several people might be discerned by serial polling and data interpretation. Adjacent pairs of grid elements could be biased to receive current from those standing within (or adjacent to) that row or column. When all pairs of row and column grid lines have been serially biased, the set of data could be analyzed to interpret the number and locations of the people standing (or walking). FIG. 5 illustrates the potential distribution; if contact is made between the cover and bottom grid surface, then currents are generated in the individual grid lines that are biased.

Figure 6:
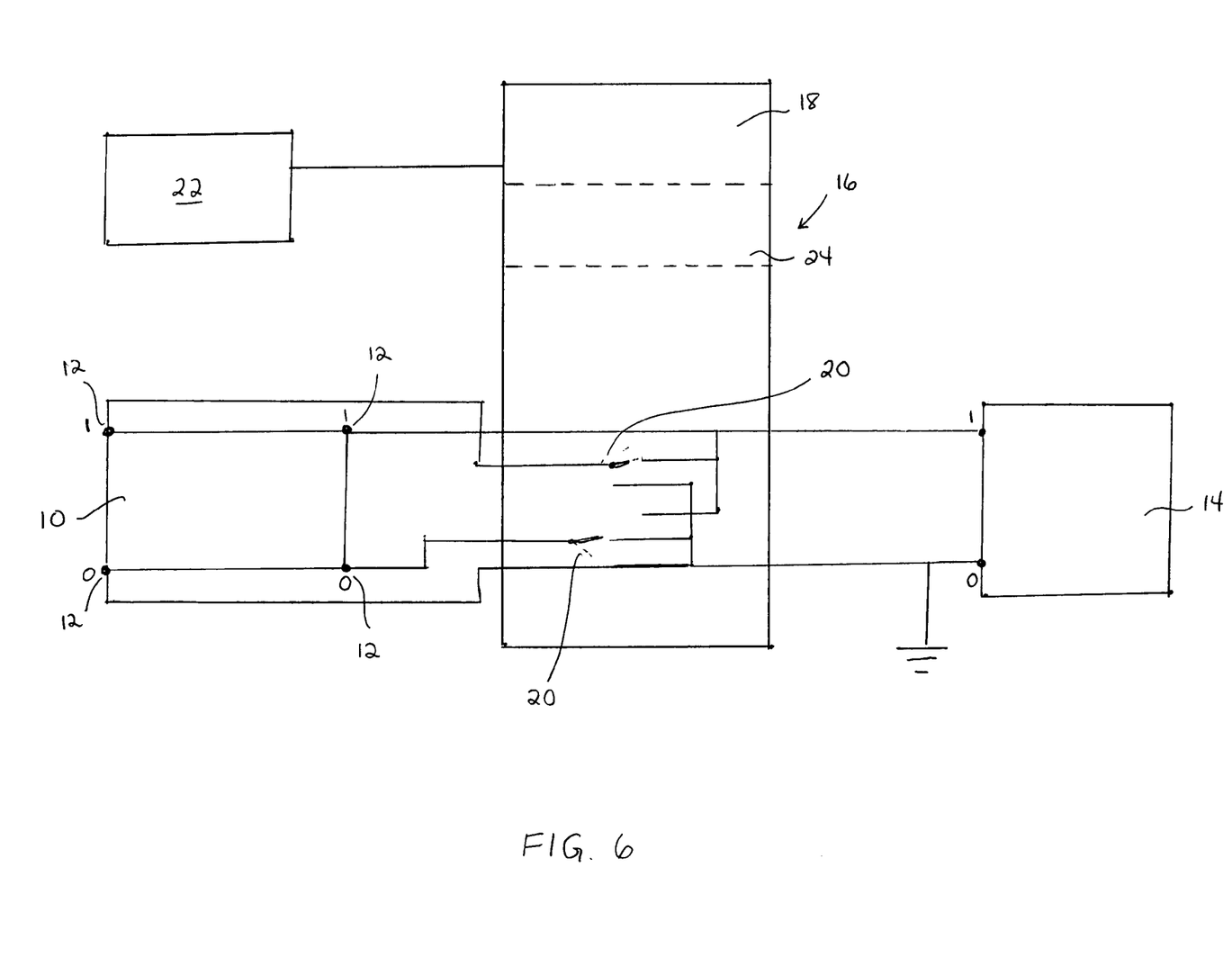
FIG. 6 shows a diagram of a touchscreen position sensor having an electric circuit that measures the potential of a point on a touch area.

FIG. 6 shows a touchscreen position sensor in which touch screen 10 containing a touch area is electrically connected via electrodes 12 to power source 14. Controller 16 contains circuit 18 that measures the potential of a point on a touch area by means of switches 20. Also shown are coversheet 22 and storage for potential readings 24.

Figure 7:
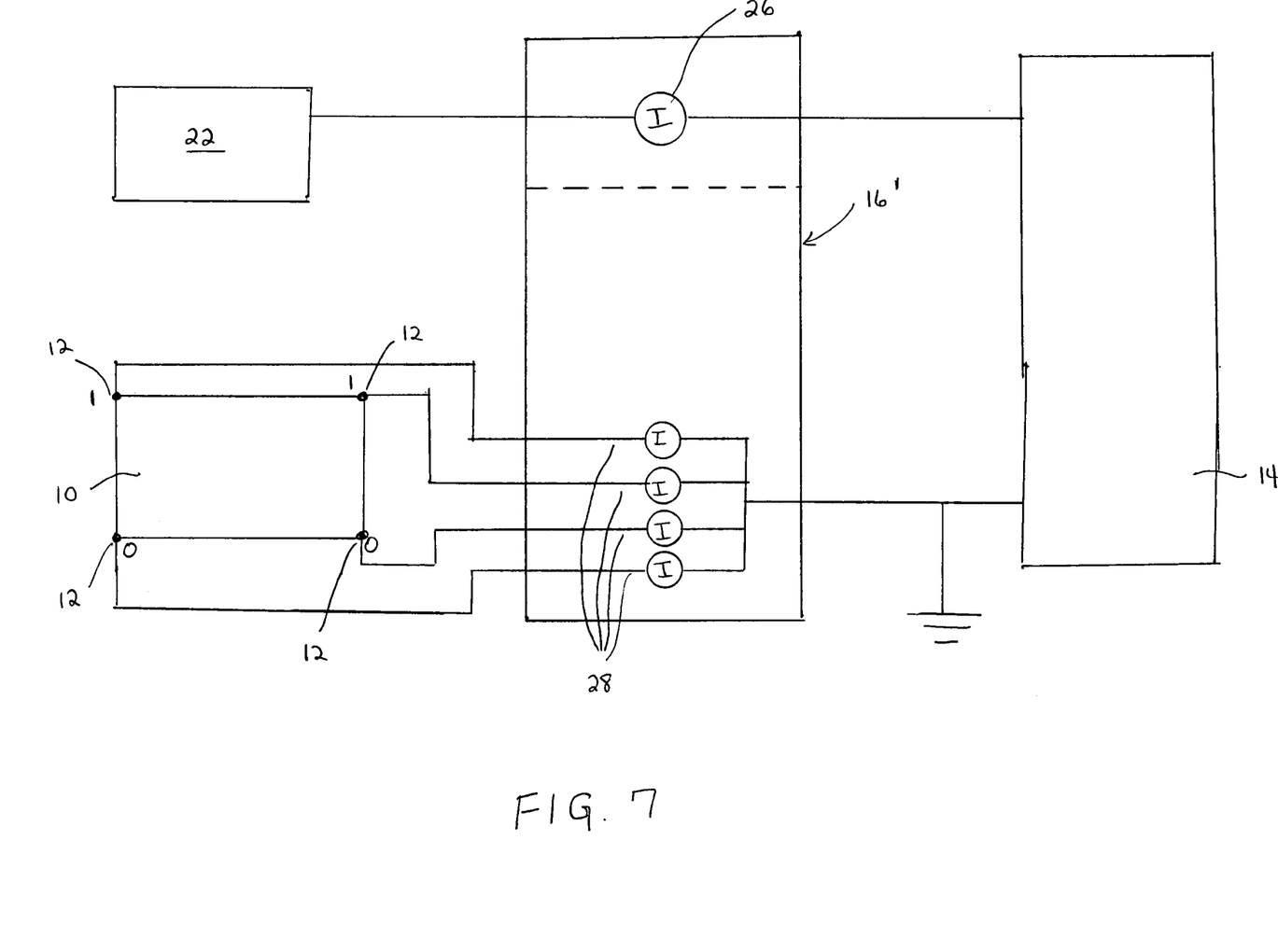
FIG. 7 shows a diagram of a touchscreen position sensor having an electric circuit that measures current received by an electrode from a point.

FIG. 7 shows a touchscreen position sensor in which touch screen 10 is electrically connected via electrodes 12 to power source 14. Controller 16' contains current measuring circuit 26 that measures current received by an electrode from a point via current measurement elements 28.

The present invention liberates the design of sensors for touch screen applications. Furthermore, this versatility comes with great simplicity and with no sacrifice of quality.

The invention relies on the fact that the surface area of a touchscreen can be divided into any number of smaller areas using lines of specified width and electrical conductivity. The smaller areas therefore divide the touchscreen into cells that need only be uniform for that particular cell. The conductive borders of each cell tend to normalize some of the non-uniformity within the cell. Furthermore, with this innovation, the construction of large touch screens can be accomplished. Without size restrictions, touchscreens have a number of new applications that were previously unavailable such as interaction with image projection equipment, position sensitive information for security, or inputs for virtual reality equipment.

In addition to the increasing number of touchscreen technology applications, the present invention could actually decrease the cost of production in some cases A major expense of manufacturing touchscreens is the precision required to make uniform touchscreens such that current may be distributed evenly along the electrically conductive surface to create the necessary equipotential lines.

If any part of the screen becomes non-uniform the screen must be re-processed. The grid decreases the uniformity requirements for touchscreen surfaces and therefore permits less rigorous manufacturing specifications. Other cost savings may be realized by lowering the time and precision required in quality control procedures.

Thus, it is believed that the overall production cost of large touch screens could be considerably reduced without the loss of quality. At the same time, new designs can be implemented without excessive engineering efforts. The combination of design freedom and the reduced production costs should impact the industry in a positive way; especially since there are markets, such as education, personnel use, and home entertainment, that would benefit from large touch screens.

Numerous alterations of the structure and methods herein described will suggest themselves to those skilled in the art. It will be understood that the details and arrangements of the parts that have been described and illustrated in order to explain the nature of the invention are not to be construed as any limitation of the invention. All such alterations which do not depart from the spirit of the invention are intended to be included within the scope of the appended claims.

We claim:

1. A touchscreen position sensor comprising
    (a) a touch area having generally relatively low conductivity;
    (b) a relatively high conductivity border defining a perimeter on the touch area;
    (c) a grid of intermediate conductivity defining cells of relatively low conductivity within the high conductivity perimeter of the touch area, the relatively high conductivity border having a conductivity at least ten times greater than the conductivity of the relatively low conductivity touch area and the grid of intermediate conductivity having a conductivity at least four times greater than the relatively low conductivity touch area;
    (d) a set of electrodes attached to the high conductivity perimeter and connected to an electrical power source;
    (e) an electric circuit that measures the potential of a selected point on the touch area when brought in proximity thereto;
    (f) a controller that sequentially switches electrical power from the power source to a first group of the electrodes thereby establishing a first electrical potential distribution on the touch area, and then to a second group of said electrodes thereby establishing a second electrical potential distribution on the touch area; and
    (g) a controller that processes sets of potential measurements of said first and second electrical potential distributions from the electric circuit to determine the location of the selected point,
    wherein the controller may select subsets of a first set of cells to poll a subset of the cells.

2. The sensor of claim 1 wherein the conductivity of the cells and the touch area are not uniform.

3. The sensor of claim 1 wherein the touch area is generally rectangular and an electrode is located near each corner of said area.

4. The sensor of claim 1 wherein polling of subsets of cells permits the determination of more than one point of simultaneous contact with the touch area.

5. The sensor of claim 1 wherein the line width of the relatively high conducting border is greater than the line width of the grid of intermediate conductivity defining cells.

6. The sensor of claim 1 wherein the grid lines are transparent to light.

7. A method of determining the location of a selected point on a sensor apparatus having a relatively highly conductive border surrounding an area of relatively low conductivity featuring a grid having a conductivity intermediate the conductivity of the border and low conductivity area, defining cells on the low conductivity area, and an associated set of electrodes through which electrical current may be applied to establish electric potential distribution on the conductive area, an electrical circuit that measures the potential of points on the conductive area when brought in proximity thereto and a controller, comprising the steps of:
    (a) introducing an electrical current to the border area through a first group of at least one electrode selected from said associated set of electrodes, and thereby establishing a first electric potential distribution within the border;
    (b) bringing the electrical circuit in proximity with a selected point within the border and thereby measuring a first potential reading of said point;
    (c) storing said first potential reading:
    (d) introducing an electrical current of the border area through a second group of at least one electrode selected from said associated set of electrodes and wherein not all of said first and second groups of electrodes are identical, and thereby establishing a second electric potential distribution within the border;
    (e) measuring the second potential reading of the selected point with the electrical circuit; and (f) processing said first and second potential readings to determine the location of the selected point, wherein the controller sequentially switches electrical power from the power source to a first subset of the electrodes thereby establishing a first subset electrical potential subset distributed within a first subset of cells as the touch area, and thereto a second subset of said electrodes thereby establishing a second subset of cells on the touch area, the controller processing the sets of potential measurements of said first and second subset electrical potential distributions to more precisely determine the location of the selected point within the cells of the intersection of the first and second subsets of cells.

8. The method of claim 7 wherein the first electric potential distribution defines a first set of potential lines within the border and the second electric potential distribution defines a second set of potential lines within the border, and said first and second sets of potential lines substantially intersect.

9. The method of claim 7 wherein said first and second readings are uniquely mapped into spatial coordinates for the selected point.

10. The method of claim 7 wherein an algorithm is implemented in software run on a controller to interpolate the first and second readings.

11. A method of determining the location of a selected point on a sensor apparatus having a relatively highly conductive border surrounding an area of relatively low conductivity featuring a grid having a conductivity intermediate the conductivity of the border and low conductivity area, defining cells on the low conductivity area, and an associated set of electrodes through which electrical current may be applied to establish electric potential distribution on the conductive area, an electrical circuit that measures the potential of points on the conductive area when brought in proximity thereto and a controller, comprising the steps of:

(a) introducing an electrical current to the border area through a first group of at least one electrode selected from said associated set of electrodes, and thereby establishing a first electric potential distribution within the border;

(b) bringing the electrical circuit in proximity with a selected point within the border and thereby measuring a first potential reading of said point;

(c) storing said first potential reading;

(d) introducing an electrical current of the border area through a second group of at least one electrode selected from said associated set of electrodes and wherein not all of said first and second groups of electrodes are identical, and thereby establishing a second electric potential distribution within the border;

(e) measuring the second potential reading of the selected point with the electrical circuit; and (f) processing said first and second potential readings to determine the location of the selected point.

the locations of multiple points of simultaneous contact being determined by polling separate subsets of cells, each subset of cells being selected to contain only one point of contact.

* * * * *